United States Patent [19]
Finsterwalder

[11] 3,747,400
[45] July 24, 1973

[54] DEVICE FOR MEASURING THE ANCHORING FORCES IN PRESTRESSED GROUND OR ROCK ANCHORS

[75] Inventor: Klemens Finsterwalder, Socking uber Starnberg, Germany

[73] Assignee: Firma Dyckerhoff & Widmann Aktiengesellschaft, Socking uber Starnberg, Germany

[22] Filed: June 30, 1971

[21] Appl. No.: 158,382

[30] Foreign Application Priority Data
July 25, 1970 Germany................. P 20 37 060.9

[52] U.S. Cl. ............................... 73/88 E, 340/213
[51] Int. Cl. .......................... G01n 3/00, G08b 3/06
[58] Field of Search........................ 73/88 F, 88 E; 85/62; 340/213, 232; 177/208

[56] References Cited
UNITED STATES PATENTS
3,111,655  11/1963  Kotarsky et al................... 85/62 X FOREIGN PATENTS OR APPLICATIONS
991,783  5/1965  Great Britain......................... 85/62

*Primary Examiner*—Richard C. Queisser
*Assistant Examiner*—Stephen A. Kreitman
*Attorney*—Robert H. Jacob

[57] ABSTRACT

The device for measuring the anchoring forces in prestressed ground or rock anchors has a cushion disposed between the anchoring device and an abutment plate to which the anchoring force is transmitted which is charged with pressure agent, and a pressure head on the abutment plate has mounted on it a bolt for operating an electric switch that operates an indicator that reflects the start of movement.

5 Claims, 2 Drawing Figures

PATENTED JUL 24 1973　　　　　　　　　3,747,400

INVENTOR.
Klemens FINSTERWALDER
BY Robert H. Jacob.

DEVICE FOR MEASURING THE ANCHORING FORCES IN PRESTRESSED GROUND OR ROCK ANCHORS

BACKGROUND OF THE INVENTION

The invention relates to a device for measuring the anchoring forces absorbed in prestressed or rock anchors by way of anchoring devices, such as, for example, anchoring plates.

In order to make it possible to examine the effectiveness of ground and rock anchors, measuring means or devices are necessary which over a period of years can reliably measure the forces that are present in the anchor. A particular problem in this connection is to so construct these measuring devices that they are non-sensitive against temperature, moisture, soiling and corrosion and that, above all, the measured quantity of the zero reading to which the device has been set does not change.

The simplest manner of measuring the forces in a prestressed anchor consists in mounting a hydraulic tension press such as is utilized for the tensioning of tensioning elements in the prestressed concrete construction. By introducing a pressure agent in the pressure space of the press, balance with the force to be measured is then established. The pressure in the hydraulic system of the press that is being measured at any moment in which the anchoring body, i.e., for example, a threaded nut, can be loosened from the anchoring device, is then a measure for the force or strength in the anchor. This method, however, is cumbersome and expensive, since a tensioning press must be set up for each measurement because it is difficult to reliably determine the point of time at which balance is established, i.e., when the force to be measured is transferred from the anchoring device to the hydraulic system.

Other measuring devices operate with pressure springs between the anchoring body and the anchoring device; in this connection the magnitude of the compression of these springs is a measure for the existing anchoring forces. Finally also the forces present in the anchor can be determined by means of the frequency of a tensioned oscillating music wire. All of these systems, however, have the shortcoming that the forces are determined indirectly, i.e., by way of deforming or frequency measurement, and that the initial value (zero reading) of the measurement has to be kept constant for the duration of the measurement, i.e., as the case may be, over a period of years.

It is an object of the invention to provide a measuring device which, by virtue of its construction and function, provides the prerequisite for an invariable zero reading and simultaneously affords a possibility of controlling the anchor strength at small expense at any time desired.

SUMMARY OF THE INVENTION

This problem is solved by the invention in that between the anchoring device and a further abutment or counter bearing body, for example an anchoring plate onto which the anchoring force is directly transmitted by the anchoring head, an enclosed or cased press which lies flat in condition of rest, that can be charged or loaded with a hydraulic pressure agent, is arranged, and that a measuring device is provided for determining the start of the movement of the counter bearing body when the enclosed press is charged or loaded. For this purpose an electric switch, for example a microswitch, may be provided that is coupled with an indicating device.

In order to constitute the device in accordance with the invention as a permanent surveillance and control system, the pressure duct to the enclosed press may be closed and a pressure container filled with gas connected thereto as resilient element.

The advantage of the invention will be found in the first place in that for the actual measurement of the anchoring force a hydraulic pressure means is employed, which permits in a manner known per se, by way of the pressure in the system and the magnitude of the loaded surface, a simple determination of the anchoring force. By the use of a pressure cushion, which in the simplest case consists of two annular pieces of sheet metal which rest flatly against one another and are welded together along their inner and outer circumferences, it is insured that the anchoring force is transferred by flat contact from metal to metal without any elements being interposed therebetween which could change the starting value of the measurement in any manner. For the control of the anchoring force it is merely necessary to apply pressure to the pressure cushion, which is possible without difficulty due to its small hollow space, and exactly catch the start of the movement of the anchor head, i.e., of the outer part of the anchor device separated by the pressure cushion. For this purpose an electric microswitch is preferably provided which is capable of closing its circuit already after a movement of 0.15mm.

BRIEF DESCRIPTION OF THE DRAWINGS

The invention is explained more in detail hereinafter with reference to an embodiment illustrated in the accompanying drawings, in which.

DESCRIPTION OF THE INVENTION

Figure 1:
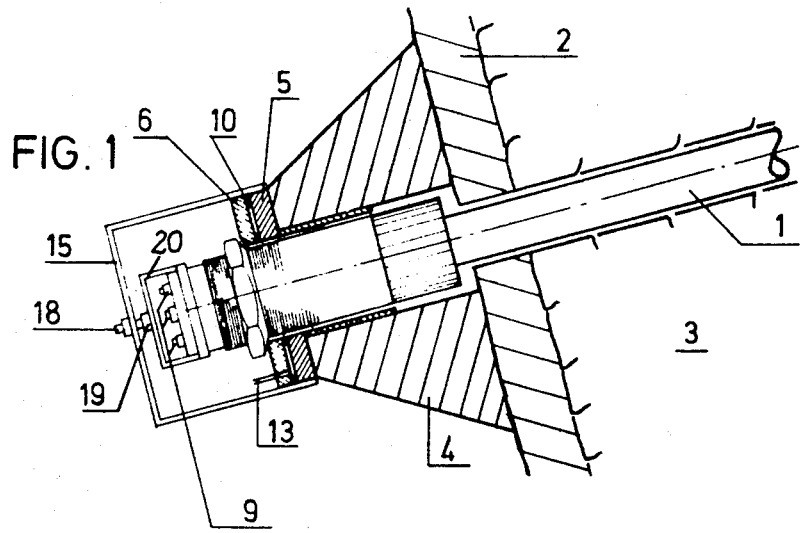
FIG. 1 is a cross-section through the anchoring head.

In the embodiment of the invention illustrated in FIG. 1 a rock anchor 1 is anchored on the outer surface of a building site 3 that is secured by means of sprayed concrete 2. The actual anchorage is disposed in a concrete socket 4.

The anchorage comprises an anchoring plate 5 which rests against the concrete socket 4 and a further anchoring or outer plate 6 against which the anchoring nut 7 is supported. The anchoring nut 7 is secured upon the surface of the anchoring head 8 by means of a thread. The anchor proper may, as shown by the example, consist of a number of individual elements 9 which are separately anchored with respect to the anchoring head 8.

Between the two anchoring plates 5 and 6 a small pressure cushion 10 is located. The pressure cushion 10 comprises two pieces of sheet metal of annular configuration that are in direct engagement with one another, which are tightly connected with one another at the inner and outer borders 11 and 12, and into the hollow space of which leads supply tube 13. The supply tube 13 extends through a suitable bore 14 in the outer anchor plate 6. Through the supply tube 13 the pressure cushion 10 can be changed with a pressure agent, for example hydraulic oil.

In the condition of rest, i.e., in the condition of the anchor under tension, the anchoring force is transferred by way of the anchoring nut 7 to the outer anchor plate 6 and from this to the lower anchor plate by way of the plates of the pressure cushion 10 that rest closely against each other with the anchoring force being transferred from the anchoring plate to the concrete socket 4. In this condition a direct take-off of the anchor force is assured without it being possible that fatigue phenomena would appear during the course of time.

If the anchoring force is to be measured, then pressure medium is pressed into the pressure cushion by way of the supply duct 13 until the pressure in the cushion is in balance with the prestressing force of the anchor. This point of time is recognized in that the outer anchor plate 6 rises from the inner anchor plate 5. In order to make it possible to quickly and safely determine this operation of movement, an electric microswitch is provided in the embodiment illustrated in the drawings.

Figure 2:
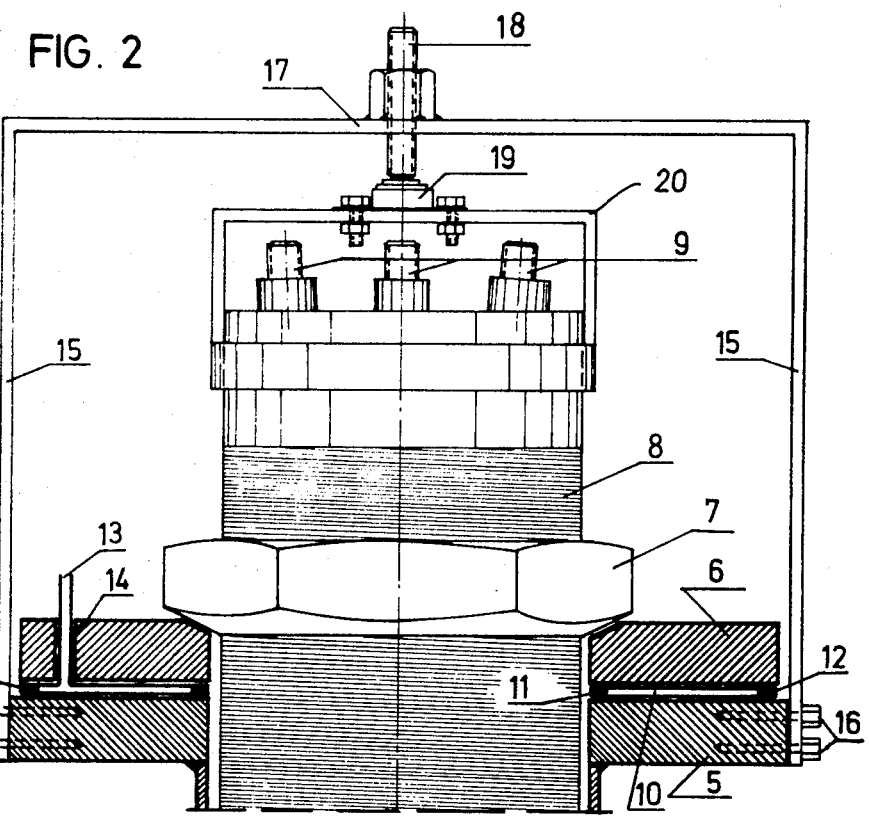
FIG. 2 is a cross-section through the anchoring body and the counter bearing member with pressure cushion, drawn to an enlarged scale.

For this purpose a strap 15 is secured to the lower anchor plate 5 by means of screws 16. At the upper bridge 17 of the stirrup 15 a bolt 18 that is adjustable by means of a fine thread is arranged which can be brought into contact with the microswitch 19 which is secured to the outer anchor plate or, as illustrated in FIG. 2, directly on the anchor head 8 by means of a stirrup 20 (FIG. 2).

With suitable setting of the switch contact the start of the movement of the anchor head 8 can be exactly determined. A signal transmitter can be actuated by way of the electric microswitch 19, for example a buzzer or a control light, that exactly signals the point of time of the start of the movement to the operating personnel when the manometer at the pressure pump has to be read. From the surface of the pressure cushion and the oil pressure that can be readily read on a manometer, which is not illustrated, the prestressing force of the anchor can be determined.

Under these conditions it is not important for the measurement to catch the beginning of the movement exactly. Minor inaccuracies introduce merely negligible deviations. The reason for that is found in that after the prestressing force is reached, the pressure in the pressure cushion rises only very slightly. In this connection the magnitude of the rise in pressure depends on the path of movement of the anchor plate and on the structural features of the anchor. Its influence on the measurement of the anchoring force thus can be readily taken into consideration. It must be observed that this manner of measurement can be undertaken at any desired point of time after the installation of the anchor and as often as desired.

If a permanent visible control of the available anchoring force is required, then the measuring device can be supplemented in a simple manner. For this purpose merely the pressure duct 13 to the pressure cushion 10 is closed after that pressure is reached which is required and sufficient for raising the anchor, and a bottle filled with gas is connected to the pressure duct as resilient element. The measurement then is effected as follows:

First the pressure in the system is increased until the anchor plate 6 has been raised about 0.25mm from the anchor plate 5. Then the pressure duct is closed. By this operation the gas in the pressure flask is strongly compressed. Then it has an effect similar to that of a very soft spring in relation to the pressure system. Small leakage losses in the conduit system therefore result only in very small, hardly noticeable, losses of pressure in the total system, so that one can start out with sufficient accuracy from a constant pressure P. If the force in the anchor changes, movements again take place in the anchor head 8 or the anchor plate 6 which can be registered by means of a metering clock or microswitches. In order to make it possible to take readings from both directions, it is of course necessary to provide effective switches in both directions.

This arrangement affords the further advantage that the ability of the measuring device to function can be tested at any time without it being necessary to release the load from the anchor.

Having now described my invention with reference to the embodiment illustrated, what I desire to protect by letters patent is set forth in the appended claims.

I claim:

1. Device for indicating a change in the anchoring forces absorbed by way of anchoring means such as anchor plates in prestressed ground or rock anchors comprising an anchoring element such as a plate, an outer plate defining an abutment member disposed proximate said element, an annular pressure cushion that is flat in the condition of rest, disposed intermediate said element and said outer plate and an anchoring head having a nut proximate said outer plate in position to transfer forces directly to said outer plate, means for applying pressure to said cushion, and a measuring device arranged between said anchoring element and said outer plate for determining the start of the movement of said outer plate as pressure is applied to said cushion.

2. Device in accordance with claim 1, where said measuring device includes an electric switch adapted to be connected to an indicating device.

3. Device in accordance with claim 2 including a stirrup mounted on said anchoring head, a strap connected to said anchoring element, and a bolt extending between said stirrup and said switch.

4. Device in accordance with claim 3 including adjusting means for said bolt on said strap.

5. Device in accordance with claim 1, where said means for applying pressure includes a closed duct in communication with said cushion and that said duct is adapted to be connected to a container filled with a pressure agent.

* * * * *